US009790991B2

(12) United States Patent
Nakagawa et al.

(10) Patent No.: US 9,790,991 B2
(45) Date of Patent: Oct. 17, 2017

(54) SYNTHETIC RESIN-MADE SLIDING BEARING

(71) Applicant: OILES CORPORATION, Tokyo (JP)

(72) Inventors: Noboru Nakagawa, Fujisawa (JP); Kazuhiko Akeda, Fujisawa (JP)

(73) Assignee: OILES CORPORATION, Tokyo (JP)

(*) Notice: Subject to any disclaimer, the term of this patent is extended or adjusted under 35 U.S.C. 154(b) by 30 days.

(21) Appl. No.: 14/787,587

(22) PCT Filed: May 7, 2014

(86) PCT No.: PCT/JP2014/002430
§ 371 (c)(1),
(2) Date: Oct. 28, 2015

(87) PCT Pub. No.: WO2014/185031
PCT Pub. Date: Nov. 20, 2014

(65) Prior Publication Data
US 2016/0061256 A1 Mar. 3, 2016

(30) Foreign Application Priority Data

May 14, 2013 (JP) ................................. 2013-102637

(51) Int. Cl.
F16C 33/20 (2006.01)
B62D 3/12 (2006.01)
(Continued)

(52) U.S. Cl.
CPC ................ F16C 33/20 (2013.01); B62D 3/12 (2013.01); F16C 17/02 (2013.01); F16C 17/24 (2013.01);
(Continued)

(58) Field of Classification Search
CPC .......... F16C 33/20; F16C 17/24; F16C 17/02; B62D 3/12
See application file for complete search history.

(56) References Cited

U.S. PATENT DOCUMENTS 3,861,764 A * 1/1975 Adams .................. B62D 3/123
384/125
5,601,370 A * 2/1997 Shibayama ............ F16C 27/02
384/215
(Continued)

FOREIGN PATENT DOCUMENTS

CN 101410638 A 4/2009
JP 4-210121 7/1992
(Continued)

OTHER PUBLICATIONS

International Search Report for PCT/JP2014/002430, dated Jul. 8, 2014, 4 pages.
(Continued)

Primary Examiner — Darlene P Condra
(74) Attorney, Agent, or Firm — Nixon & Vanderhye P.C.

(57) ABSTRACT

A sliding bearing 4 includes a bearing base portion 9 having a notched portion 8, a bearing portion 12 having an outer peripheral surface 10 adapted to be brought into contact with an inner peripheral surface 3 of a gear case 2, a pair of bearing portions 14 sandwiching the bearing portion 12 through each of a pair of slits 13 in a direction R about an axis O, and a pair of circular arc portions 17 sandwiching the pair of bearing portions 14 through each of a pair of slits 15 in the direction R about the axis.

12 Claims, 8 Drawing Sheets

(51) Int. Cl.
*F16C 17/02* (2006.01)
*F16C 17/24* (2006.01)

(52) U.S. Cl.
CPC ...... *F16C 2208/30* (2013.01); *F16C 2208/60* (2013.01); *F16C 2208/66* (2013.01); *F16C 2208/76* (2013.01); *F16C 2326/24* (2013.01)

(56) References Cited

U.S. PATENT DOCUMENTS

| | | | |
|---|---|---|---|
| 7,220,056 B2 * | 5/2007 | Kubota | B62D 1/16 384/215 |
| 7,784,804 B2 | 8/2010 | Span et al. | |
| 8,429,991 B2 * | 4/2013 | Kim | B62D 3/12 180/427 |
| 2009/0000853 A1 | 1/2009 | Hirose et al. | |
| 2011/0016997 A1 | 1/2011 | Oki et al. | |
| 2015/0020618 A1 * | 1/2015 | Kawakubo | F16C 29/02 74/30 |
| 2015/0204381 A1 * | 7/2015 | Zaike | F16C 27/063 384/202 |
| 2015/0274193 A1 * | 10/2015 | Saito | F16C 35/02 74/422 |

FOREIGN PATENT DOCUMENTS

| | | |
|---|---|---|
| JP | 2000-177606 | 6/2000 |
| JP | 2006-76541 | 3/2006 |
| JP | 2007-9962 | 1/2007 |
| JP | 2007-187285 | 7/2007 |
| JP | 2009-243653 | 10/2009 |

OTHER PUBLICATIONS

Notice of the First Office Action dated Sep. 18, 2016 in Chinese Application No. 201480027173.0, with English translation (17 pages).

\* cited by examiner (A)　　　　　　(B)　　　　　　(C)

SYNTHETIC RESIN-MADE SLIDING BEARING

This application is the U.S. national phase of International Application No. PCT/JP2014/002430 filed 7 May 2014, which designated the U.S. and claims priority to JP Patent Application No. 2013-102637 filed 14 May 2013, the entire contents of each of which are hereby incorporated by reference.

TECHNICAL FIELD

The present invention relates to a synthetic resin-made sliding bearing, and more particularly to a synthetic resin-made sliding bearing suitably used to slidably support a rack shaft in a steering mechanism of an automobile.

BACKGROUND ART

In a rack-and-pinion type steering apparatus in a motor vehicle such as an automobile, the turning of a steering wheel rotates a pinion shaft connected to it, and a rack shaft meshing with this pinion shaft is moved in the left and right directions inside a gear case so as to effect the steering of the steered wheels connected thereto.

In such a rack-and-pinion type steering apparatus, in the case of a motor vehicle traveling on unpaved road surfaces or the like, the rack shaft having rack teeth meshing with the teeth of the pinion receives an excessively large load from the road surface, so that the rack shaft is adapted to be movably supported inside the gear case through a bearing at a position close to the pinion.

PRIOR ART DOCUMENT

Patent Document

Patent Document 1: Specification of U.S. Pat. No. 7784804

SUMMARY OF THE INVENTION

Problems that the Invention is to Solve

Meanwhile, a synthetic resin-made bearing does not generate a striking sound between the same and the rack shaft and permits smooth steering operation between the rack shaft and the bearing even in the steering operation in a state in which a radial force acts on the rack shaft. However, with a bearing which is adapted to support the rack shaft with a clearance as described in Patent Document 1, if the rack shaft receives an excessively large load from the road surface, the problem of generation of abnormal noise such as rattling noise and teeth hammering noise occurs.

The present invention has been devised in view of the above-described aspects, and its object is to provide a synthetic resin-made sliding bearing which is capable of smoothly supporting the rack shaft axially movably without causing a decline in its supporting force, and of reducing the occurrence of abnormal noise such as rattling noise and teeth hammering noise even in cases where the rack shaft receives an excessively large load from the road surface.

Means for Solving the Problems

In accordance with the present invention, a synthetic resin-made sliding bearing adapted to be interposed between a rack shaft and a gear case by being fixed to an inner peripheral surface of the gear case in order to support the rack shaft inside the gear case movably in an axial direction, comprises: a semiannular bearing base portion which has a notched portion on a rack teeth side of the rack shaft; a first bearing portion which has a circular arc-shaped outer peripheral surface adapted to be brought into contact with the inner peripheral surface of the gear case and extends integrally in the axial direction from one axial semiannular end face of the bearing base portion; and a pair of second bearing portions which extend integrally in the axial direction from the one axial semiannular end face of the bearing base portion in such a manner as to sandwich the first bearing portion through each of a pair of slits in a direction about an axis, wherein the first bearing portion has a first bearing surface which is adapted to oppose an outer peripheral surface of the rack shaft on an opposite side to the rack teeth side of the rack shaft with a clearance therebetween, and each of the second bearing portions has a second bearing surface which is adapted to be brought into slidable contact with the outer peripheral surface of the rack shaft.

According to the above-described synthetic resin-made sliding bearing in accordance with the present invention, since the pair of second bearing portions extend integrally in the axial direction from the one axial semiannular end face of the bearing base portion in such a manner as to sandwich the first bearing portion through a pair of slits in a direction about the axis, and each of the second bearing portions has a second bearing surface which is adapted to be brought into slidable contact with the outer peripheral surface of the rack shaft, it is possible to support the rack shaft by the second bearing surfaces from two directions, with the result that it is possible to prevent a decline in the supporting force with respect to the rack shaft and smoothly support the rack shaft movably in the axial direction. Moreover, since the first bearing portion sandwiched by the pair of second bearing portions through the slits in the direction about the axis has the first bearing surface adapted to oppose the outer peripheral surface of the rack shaft on the opposite side to the rack teeth side of the rack shaft with the clearance therebetween, even in cases where the rack shaft has received an excessively large load from the road surface and the rack shaft has undergone a large displacement, the rack shaft is supported also by the first bearing surface in such a state as to be supported by the pair of second bearing portions, with the result that it becomes possible to reduce the generation of abnormal noise such as rattling noise and teeth hammering noise.

In the present invention, the first bearing portion may have the outer peripheral surface which is adapted to be brought into contact with the inner peripheral surface of the gear case and an inner peripheral surface on which the first bearing surface is provided, and each of the second bearing portions may have an outer peripheral surface which is adapted to oppose the inner peripheral surface of the gear case with a clearance therebetween and an inner peripheral surface on which the first bearing surface adapted to be brought into slidable contact with the outer peripheral surface of the rack shaft is provided.

In a preferred embodiment of the present invention, the first bearing portion includes a circular arc portion which, at the outer peripheral surface thereof, is adapted to be brought into contact with the inner peripheral surface of the gear case and extends integrally in the axial direction from the one axial semiannular end face of the bearing base portion, and a protruding portion which has a bearing surface formed at a protruding end face thereof and is provided integrally on an inner peripheral surface of the circular arc portion in such a manner as to protrude radially inwardly from the inner peripheral surface of the circular arc portion, so as to oppose the outer peripheral surface of the rack shaft on the opposite side to the rack teeth side of the rack shaft with a clearance therebetween. In another preferred embodiment of the present invention, each of the pair of second bearing portions includes an elastically flexible circular arc portion which, at the outer peripheral surface thereof, is adapted to oppose the inner peripheral surface of the gear case with a clearance therebetween and extends integrally in the axial direction from the one axial semiannular end face of the bearing base portion, and a protruding portion which has a second bearing surface formed at a protruding end face thereof and is provided integrally in such a manner as to protrude radially inwardly from an inner peripheral surface of the circular arc portion.

In these embodiment, since the first bearing surface and the second bearing surfaces are formed on the protruding end faces, respectively, of the protruding portions, the supporting surfaces for the rack shaft can be localized, with the result that it is possible to reduce frictional resistance with respect to the axial movement of the rack shaft, thereby making it possible to allow the rack shaft moving in the axial direction to be supported by a small resisting force. In addition, particularly in the latter embodiment, since the second bearing surface is formed on the protruding portion provided on the elastically flexible circular arc portion, the circular arc portion can be elastically deflected in correspondence with the radial displacement of the rack shaft, with the result that this also makes it possible to reduce frictional resistance with respect to the axial movement of the rack shaft, thereby making it possible to allow the rack shaft moving in the axial direction to be supported by a small resisting force.

In still another preferred embodiment of the present invention, the pair of second bearing portions are elastically deflectable in radially inward and outward directions by using the bearing base portion as a fulcrum.

In such an embodiment as well, it is it possible to reduce frictional resistance with respect to the axial movement of the rack shaft, thereby making it possible to allow the rack shaft moving in the axial direction to be supported by a small resisting force.

In addition, in a further preferred embodiment of the present invention, the first bearing surface is adapted to be brought into contact with the outer peripheral surface of the rack shaft by the displacement of the rack shaft exceeding a fixed amount in the direction perpendicular to the axial direction and directed from the rack teeth side of the rack shaft toward the opposite side to the rack teeth side of the rack shaft, and in this embodiment it is possible to limit the large displacement of the rack shaft in that direction.

In the present invention, the pair of second bearing surfaces may be simply adapted to be brought into contact with the outer peripheral surface of the rack shaft; however, in order to firmly support the rack shaft, the pair of second bearing surfaces may be adapted to be brought into contact with the outer peripheral surface of the rack shaft with an interference for tightening the rack shaft.

In the present invention, at least one of the first bearing surface and the pair of second bearing surfaces may be constituted by a circular arc-shaped concave surface having a radius of curvature substantially identical to a radius of curvature of the outer peripheral surface of the rack shaft, or may be constituted by a circular arc-shaped concave surface having a radius of curvature substantially greater than the radius of curvature of the outer peripheral surface of the rack shaft, or may be constituted by a circular arc-shaped convex surface or a flat surface.

In a preferred embodiment of the present invention, the pair of second bearing portions are formed integrally on the bearing base portion in such a manner as to be spaced apart from each other with the first bearing portion located therebetween in the direction about the axis, such that a central angle formed, with the first bearing portion located in between, by central points in the direction about the axis of the second bearing surfaces coming into contact with the outer peripheral surface of the rack shaft has an angle not greater than 180°, preferably an angle of from 120° to 70°, more preferably an angle of from 100° to 80°.

The sliding bearing in accordance with the present invention may further comprise: a pair of circular arc portions extending integrally in the axial direction from the one axial semiannular end face of the bearing base portion in such a manner as to sandwich the pair of second bearing portions through each of a pair of other slits in the direction about the axis. In this case, each of the pair of circular arc portions may have an outer peripheral surface adapted to be brought into contact with the inner peripheral surface of the gear case and an inner peripheral surface adapted to oppose the outer peripheral surface of the rack shaft with a clearance therebetween.

As the synthetic resin for forming the sliding bearing in accordance with the present invention, one which excels in abrasion resistance, has a low friction characteristic, and has predetermined flexibility and rigidity and small thermal expansion and contraction is preferable. Specifically, it is possible to cite, among others, a synthetic resin which includes at least one of polyacetal resin, polyamide resin, polyolefin resin, and fluoro resin.

Advantages of the Invention

According to the present invention, it is possible to provide a synthetic resin-made sliding bearing which is capable of smoothly supporting the rack shaft axially movably without causing a decline in its supporting force, and of reducing the occurrence of abnormal noise such as rattling noise and teeth hammering noise even in cases where the rack shaft receives an excessively large load from the road surface.

MODE FOR CARRYING OUT THE INVENTION

Figure 1:
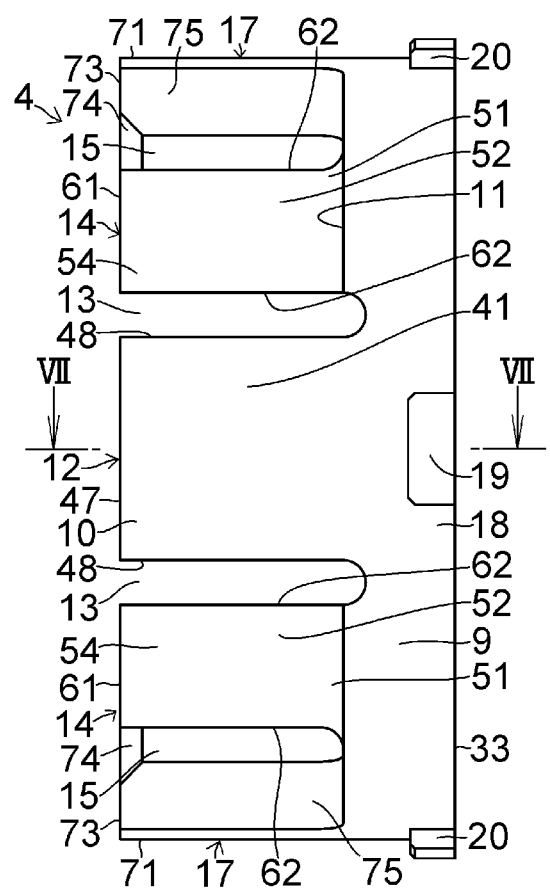
FIG. 1 is an explanatory front elevational view of a preferred embodiment of the invention.
Figure 2:
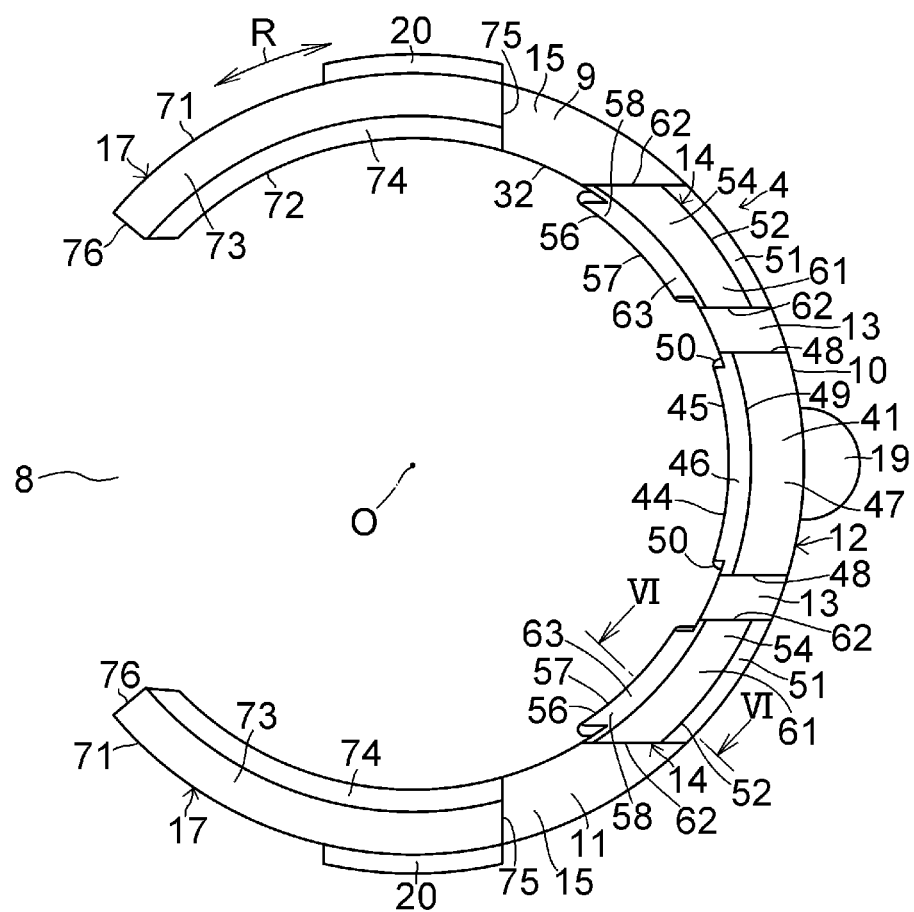
FIG. 2 is an explanatory left side elevational view of the embodiment shown in FIG. 1.
Figure 3:
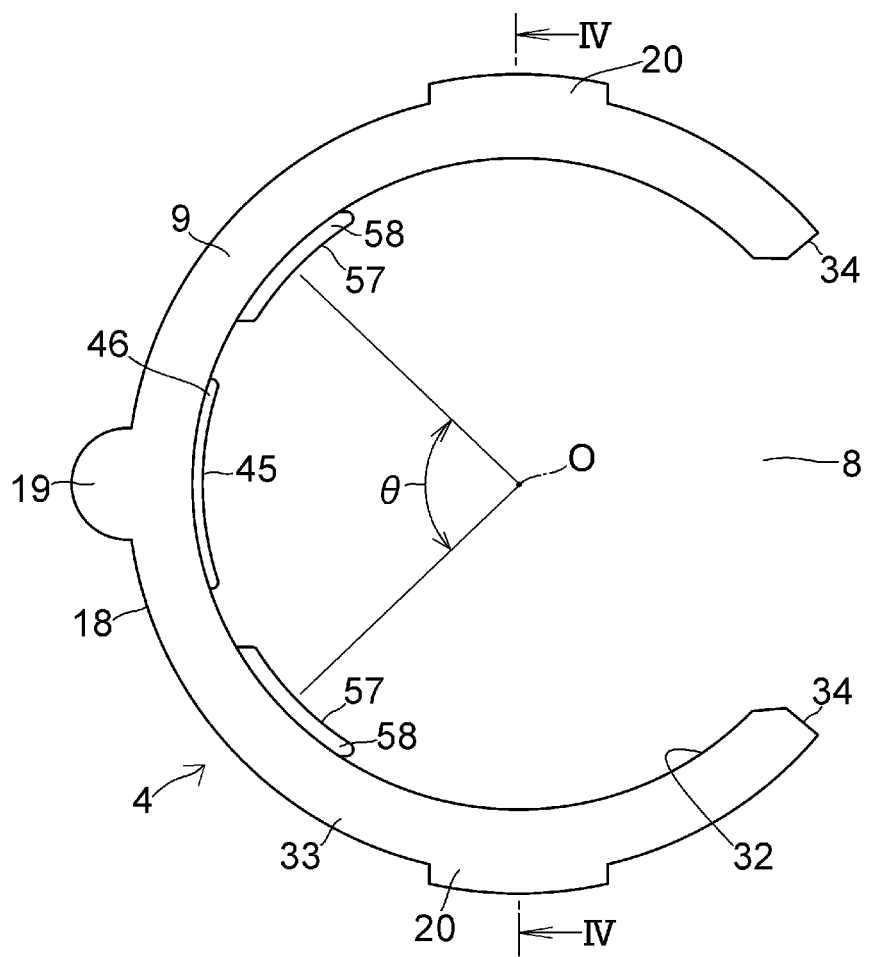
FIG. 3 is an explanatory right side elevational view of the embodiment shown in FIG. 1.
Figure 4:
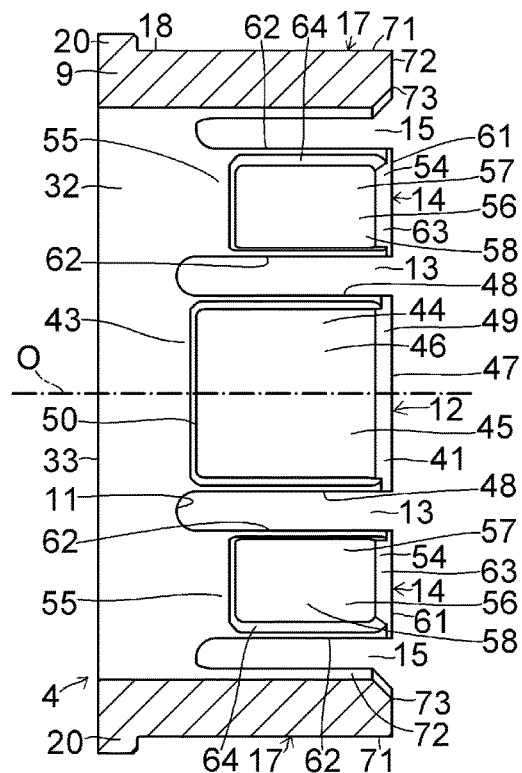
FIG. 4 is an explanatory cross-sectional view taken in the direction of arrow along line IV-IV shown in FIG. 3.
Figure 5:
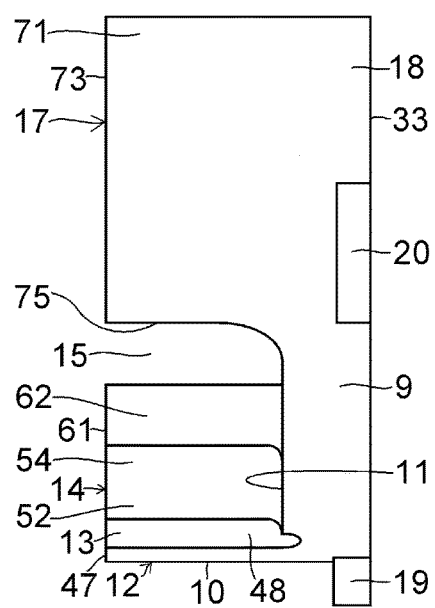
FIG. 5 is an explanatory plan view of the embodiment shown in FIG. 1.
Figure 6:
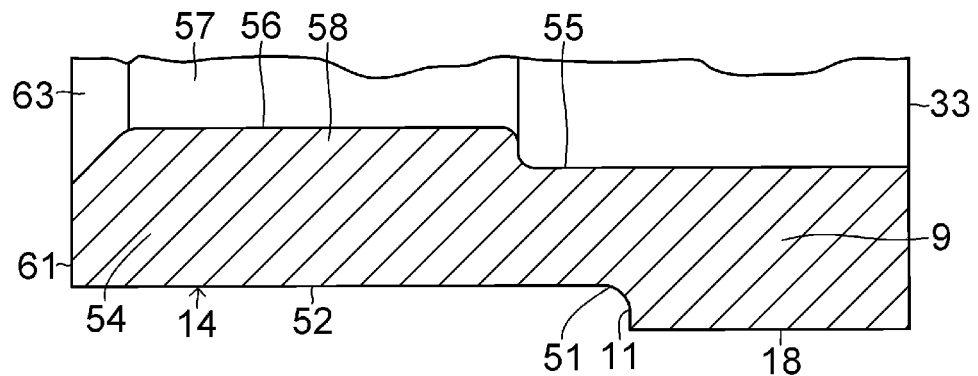
FIG. 6 is an explanatory cross-sectional view taken in the direction of arrow along line VI-VI shown in FIG. 2.
Figure 7:
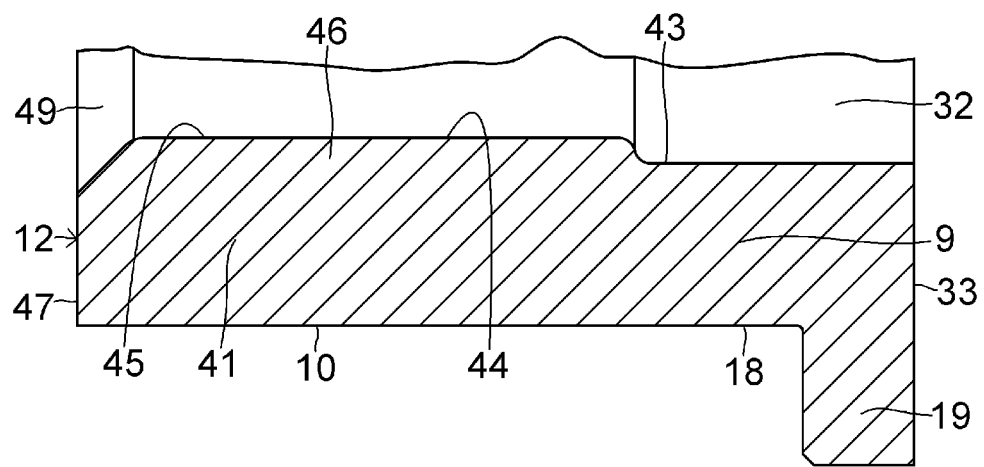
FIG. 7 is an explanatory cross-sectional view taken in the direction of arrow along line VII-VII shown in FIG. 1.
Figure 8:
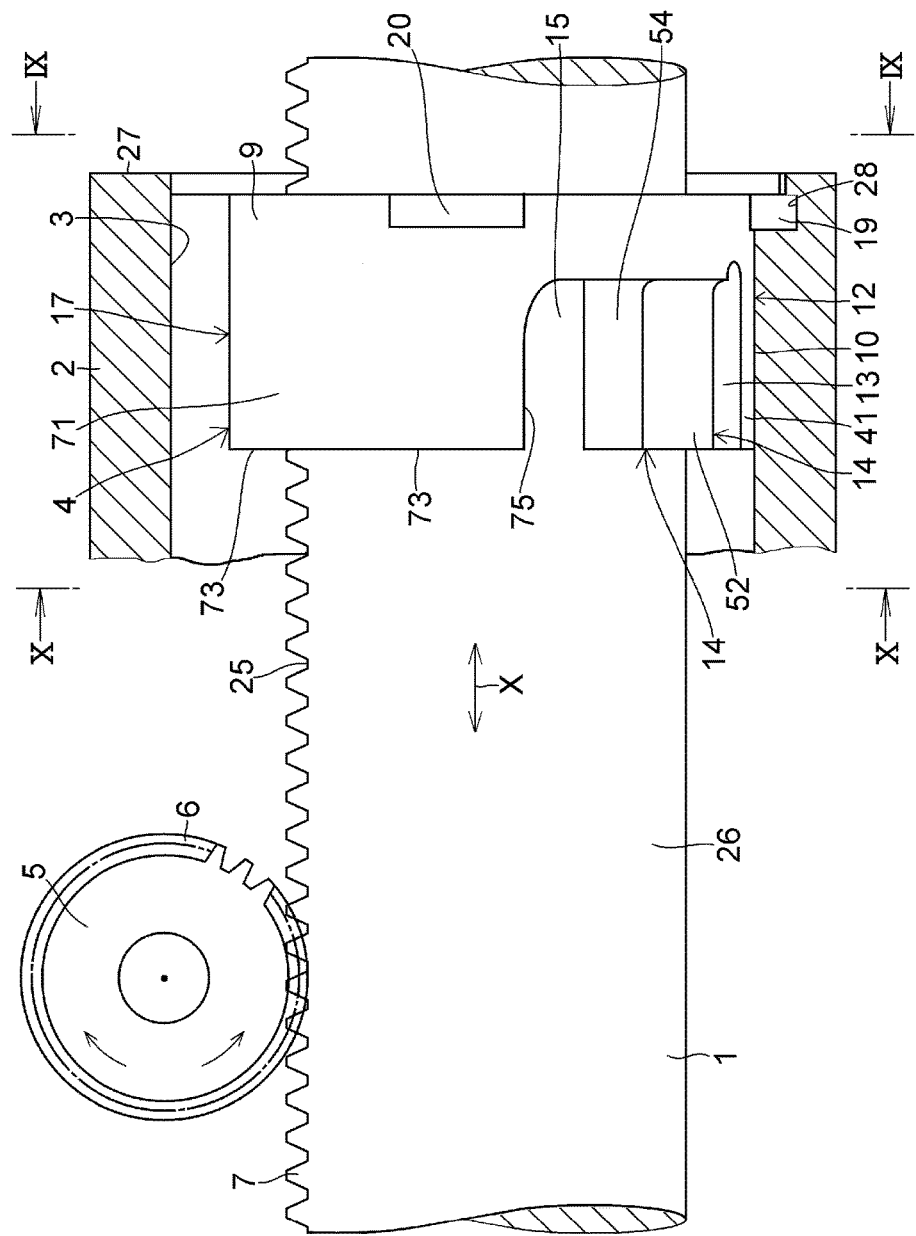
FIG. 8 is an explanatory cross-sectional view of an example of use of the embodiment shown in FIG. 1.
Figure 9:
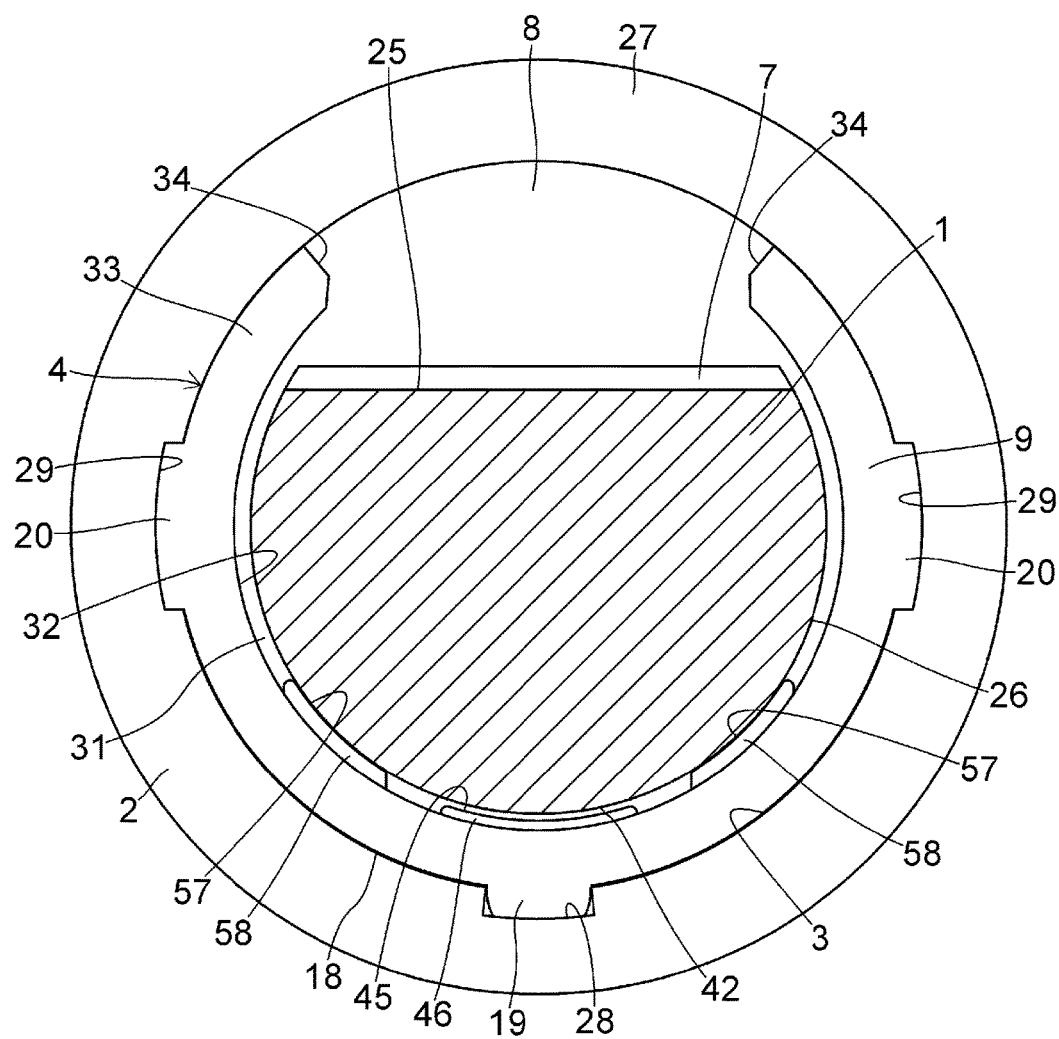
FIG. 9 is an explanatory cross-sectional view taken in the direction of arrow along line IX-IX shown in FIG. 8.
Figure 10:
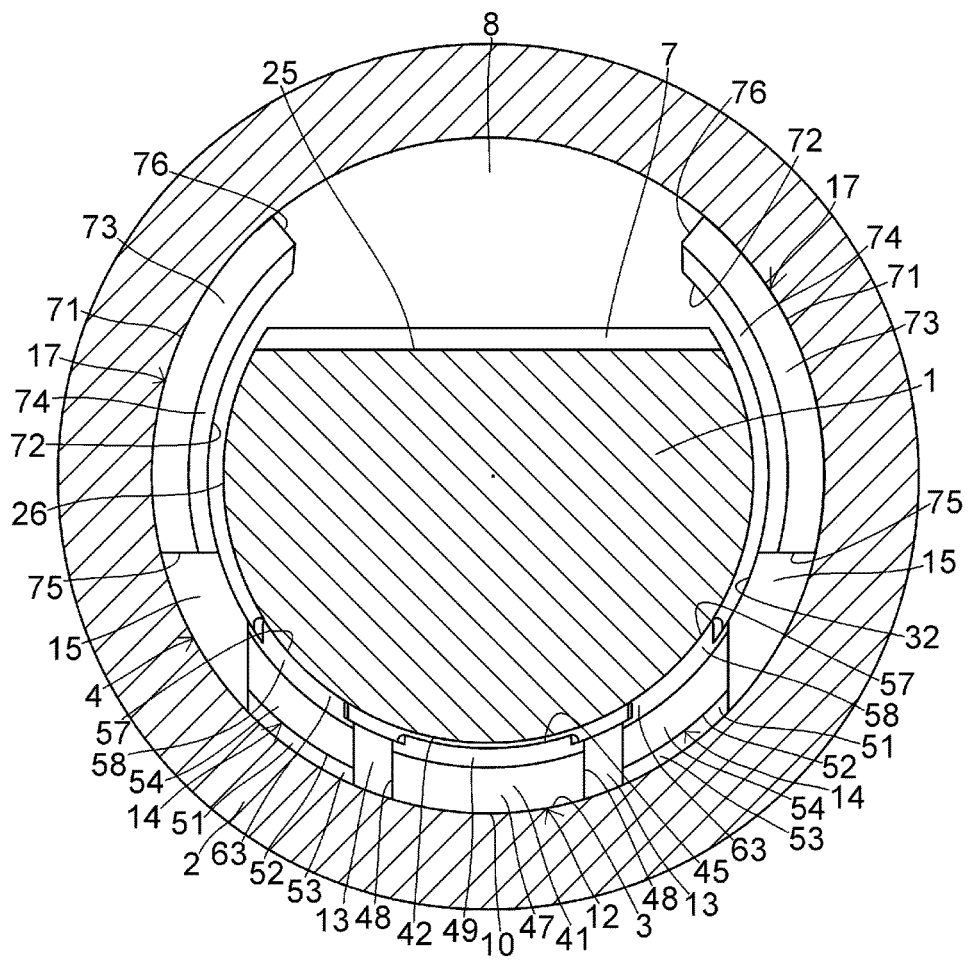
FIG. 10 is an explanatory cross-sectional view taken in the direction of arrow along line X-X shown in FIG. 8.

Next, a more detailed description will be given of the mode for carrying out the present invention on the basis of the embodiments illustrated in the drawings. It should be noted that the present invention is not limited to these embodiments.

In FIGS. 1 to 10, a synthetic resin-made sliding bearing 4 in accordance with this embodiment, which is adapted to be interposed between a rack shaft 1 and a gear case 2 by being fixed to a cylindrical inner peripheral surface 3 of the gear case 2 in order to support the rack shaft 1 inside the gear case 2 movably in an axial direction X, includes: a semiannular bearing base portion 9 having a notched portion 8 on the side of rack teeth 7 of the rack shaft 1 meshing with teeth 6 of a pinion shaft 5; a bearing portion 12 which has a circular arc-shaped outer peripheral surface 10 adapted to be brought into contact with the inner peripheral surface 3 of the gear case 2 and extends integrally in the axial direction X from one semiannular end face 11 in the axial direction X of the bearing base portion 9; a pair of bearing portions 14 which extend integrally from the end face 11 of the bearing base portion 9 in the axial direction X and in the same direction as the extending direction of the bearing portion 12 in such a manner as to sandwich the bearing portion 12 through each of a pair of slits 13 in a direction R about an axis O; a pair of circular arc-shaped portions 17 which extend integrally from the end face 11 of the bearing base portion 9 in a direction which is the axial direction X and the same direction as the extending direction of the bearing portions 12 and 14 in such a manner as to sandwich the pair of bearing portions 14 through each of a pair of slits 15 in the direction R about the axis; a semicircular projection 19 formed integrally on a semicylindrical outer peripheral surface 18 of the bearing base portion 9 in correspondence with the radial direction with respect to the bearing portion 12; and a pair of circular arc-shaped projections 20 formed integrally on the outer peripheral surface 18 of the bearing base portion 9 in correspondence with the radial direction with respect to the pair of circular arc-shaped portions 17, respectively.

The rack shaft 1 has a flat surface 25 with the rack teeth 7 formed thereon and a semicylindrical outer peripheral surface 26 which is continuously connected at its both ends to both ends of the flat surface 25 with the rack teeth 7 formed thereon. The gear case 2 has on its inner peripheral surface 3 a pair of recessed portions 28 and 29 which are fitted to and receive the projections 19 and 20 on a cylindrical end face 27 in the axial direction X, respectively.

The bearing base portion 9, which has the end faces 11 and is, at its semicylindrical outer peripheral surface 18, adapted to be brought into contact with the inner peripheral surface 3 of the gear case 2, includes, in addition to the end faces 11 and the outer peripheral surface 18, a semicylindrical inner peripheral surface 32 which is made elastically shrinkable in diameter by its notched portion 8 disposed on the rack teeth 7 side of the rack shaft 1 in face-to-face relation to the flat surface 25, and surrounds the rack shaft 1 with a clearance 31 with respect to the outer peripheral surface 26 of the rack shaft 1; another semiannular end face 33 in the axial direction X; and a pair of side surfaces 34 which define the notched portion 8 in the direction R, oppose each other in that direction R, and each have a tapered surface.

The bearing portion 12 includes a circular arc portion 41 which, at its outer peripheral surface 10 flush with the outer peripheral surface 18, is adapted to be brought into contact with the inner peripheral surface 3 of the gear case 2 and extends integrally in the axial direction X from one semiannular end face 11 in the axial direction X of the bearing base portion 9, as well as a protruding portion 46 which has a bearing surface 45 formed at its protruding end face 44 and is provided integrally on an inner peripheral surface 43 of the circular arc portion 41 in such a manner as to protrude radially inwardly from the inner peripheral surface 43 of the circular arc portion 41 flush with the inner peripheral surface 32, so as to oppose the outer peripheral surface 26 of the rack shaft 1 on its opposite side to the rack teeth 7 side of the rack shaft 1 with a clearance 42 therebetween. Thus, the bearing portion 12, which has the bearing surface 45 adapted to oppose the outer peripheral surface 26 of the rack shaft 1 on its opposite side to the rack teeth 7 side of the rack shaft 1 with the clearance 42 therebetween, has the inner peripheral surface 43 with the bearing surface 45 provided thereon and the outer peripheral surface 10 constituted by a circular arc-shaped convex surface having a radius of curvature substantially identical to the radius of curvature of the inner peripheral surface 3 of the gear case 2, so as to be brought into contact with the overall surface of the inner peripheral surface 3 of the gear case 2. The bearing surface 45, which is constituted by a circular arc-shaped concave surface having a radius of curvature substantially identical to the radius of curvature of the outer peripheral surface 26 of the rack shaft 1, is adapted to be brought into contact with the outer peripheral surface 26 of the rack shaft 1 by a displacement of the rack shaft 1 exceeding a fixed amount in a direction perpendicular to the axial direction X and directed from the rack teeth 7 side of the rack shaft 1 toward the opposite side to the rack teeth 7 side of the rack shaft 1, i.e., by a displacement of the rack shaft 1 exceeding the radial width of the clearance 42.

The circular arc portion 41 having the circular arc-shaped outer peripheral surface 10 flush with the outer peripheral surface 18 has, in addition to the outer peripheral surface 10 and the inner peripheral surface 43, an end face 47 in the axial direction X and a pair of side surfaces 48 which are perpendicular to the end face 47, are parallel to each other, and oppose each other in the direction R. The protruding portion 46 has an inclined surface 49 continuously connected to the end face 47 and a curved convex surface 50 continuously connected to the inner peripheral surface 43, and the bearing surface 45 is continuously connected to the inclined surface 49 and the curved convex surface 50 and is surrounded by the inclined surface 49 and the curved convex surface 50.

Each of the pair of bearing portions 14, which are formed symmetrically with respect to the bearing portion 12 in the direction R, has an elastically flexible circular arc portion 54 which is adapted to oppose the inner peripheral surface 3 of the gear case 2 with a clearance 53 at its outer peripheral surface 52 continuously connected to the outer peripheral surface 18 through a curved concave surface 51 and extends integrally in the axial direction X from the one axial semiannular end face 11 of the bearing base portion 9, as well as a protruding portion 58 which is provided integrally in such a manner as to protrude radially inwardly from an inner peripheral surface 55 of the circular arc portion 54 and has a bearing surface 57 formed on its protruding end face 56.

Thus, each of the bearing portions 14 has the outer peripheral surface 52 adapted to oppose the inner peripheral surface 3 of the gear case 2 with the clearance 53 and the inner peripheral surface 55 provided with the bearing surface 57 adapted to be brought into slidable contact with the outer peripheral surface 26 of the rack shaft 1.

The clearance 31 has a radial width greater than the radial width of the clearance 53, and the clearance 53 has a radial width greater than the radial width of the clearance 42. The respective circular arc portions 54 of the bearing portion 14 having the bearing surface 57 which is adapted to be brought into slidable contact with the outer peripheral surface 26 of the rack shaft 1 is elastically deflectable in the radially inward and outward directions by using the bearing base portion 9 as a fulcrum. Each of the bearing portions 14 is adapted to be brought into contact with the outer peripheral surface 26 of the rack shaft 1 at the bearing surface 57 with an interference, and the pair of bearing portions 14 are formed integrally on the bearing base portion 9 in such a manner as to be spaced apart from each other with the bearing portion 12 located therebetween in the direction R about the axis, such that a central angle formed, with the bearing portion 12 located in between, by central points in the direction R about the axis of the bearing surfaces 57 coming into contact with the outer peripheral surface 26 of the rack shaft 1 has an angle of substantially 90°. Each of the bearing surfaces 57 of the bearing portion 14 is constituted by a circular arc-shaped concave surface having a radius of curvature substantially identical to the radius of curvature of the outer peripheral surface 26 of the rack shaft 1, while each of the outer surfaces 52 is constituted by a circular arc-shaped convex surface having a radius of curvature substantially identical to the radius of curvature of the inner peripheral surface 3 of the gear case 2.

Each of the circular arc portions 54 having the circular arc-shaped inner peripheral surface 55 flush with the inner peripheral surface 32 and the outer peripheral surface 52 adapted to oppose the inner peripheral surface 3 of the gear case 2 with the clearance 53 includes, in addition to the inner peripheral surface 55 and the outer peripheral surface 52, an end face 61 in the axial direction X disposed at the same position as the end face 47 in the axial direction X and a pair of side surfaces 62 which are perpendicular to the end face 61, are parallel to each other and are also parallel to the side surface 48, and oppose each other in the direction R. The protruding portion 58 has an inclined surface 63 continuously connected to the end face 61 and a curved convex surface 64 continuously connected to the inner peripheral surface 55, and the bearing surface 57 is continuously connected to the inclined surface 63 and the curved convex surface 64 and is surrounded by the inclined surface 63 and the curved convex surface 64.

Each of the pair of slits 13 formed symmetrically with respect to the bearing portion 12 in the direction R is defined by the side surface 48 and the side surface 62, and its one end in the axial direction X is open, while its other end in the axial direction X is closed by the end face 11 of the bearing base portion 9 curved into a concaved form.

Each of the pair of circular arc portions 17 includes a circular arc-shaped outer peripheral surface 71 which is flush with the outer peripheral surface 18 of the bearing base portion 9 and is brought into contact with the outer peripheral surface 3 of the gear case 2, a circular arc-shaped inner peripheral surface 72 which is flush with the inner peripheral surface 32 of the bearing base portion 9 and opposes the outer peripheral surface 26 of the rack shaft 1 with the clearance 31 with the inner peripheral surface 3 of the gear case 2, a semiannular end face 73 in the axial direction X disposed at the same position of the end face 47 in the axial direction X, a semiannular tapered surface 74 which is continuously connected, on one side, to the inner peripheral surface 72 and, on the other side, to the inner peripheral surface 72, respectively, in the radial direction, a side surface 75 which is perpendicular to the end faces 73 and 61 and defines the slit 15 in cooperation with the side surface 62, and a side surface 76 which is flush with the side surface 34 and includes a tapered surface defining the notched portion 8 in the direction R.

Each of the pair of slits 15 formed symmetrically with respect to the bearing portion 12 in the direction R is defined by the side surface 62 and the side surface 75, and, in the same way as the slit 13, its one end in the axial direction X is open, while its other end in the axial direction X is closed by the end face 11 of the bearing base portion 9 curved into a concaved form.

In the above-described sliding bearing 4, which is interposed between the rack shaft 1 and the gear case 2 by being fixed to the inner peripheral surface 3 of the gear case 2 in a state in which the projection 19 is fitted in the recessed portion 28 to prevent coming-off from the gear case 2 in the axial direction X and the projection 20 is fitted in the recessed portion 29 to prevent rotation with respect to the gear case 2 in the direction R, since the bearing base portion 9 which is made elastically shrinkable in diameter by the notched portion 8 is provided, it is possible to improve the efficiency of fitting to the inner peripheral surface 3 of the gear case 2. In addition, since the pair of bearing portions 14 extend integrally in the axial direction X from the one semiannular end face 11 in the axial direction X of the bearing base portion 9 in such a manner as to sandwich the bearing portion 12 through the slits 13 in the direction R, and each have the bearing surface 57 adapted to be brought into slidable contact with the outer peripheral surface 26 of the rack shaft 1, it is possible to support the rack shaft 1 by the bearing surfaces 57 from two directions, with the result that it is possible to prevent a decline in the supporting force with respect to the rack shaft 1 and smoothly support the rack shaft 1 movably in the axial direction X. Moreover, since the bearing portion 12 sandwiched by the pair of bearing portions 14 through the slits 13 in the direction R has the bearing surface 45 adapted to oppose the outer peripheral surface 26 of the rack shaft 1 on its opposite side to the rack teeth side of the rack shaft 1 with the clearance 42 therebetween, even in cases where the rack shaft 1 has received an excessively large load from the road surface and the rack shaft 1 has undergone a large displacement, the rack shaft 1 is supported also by the bearing surface 45 in such a state as to be supported by the pair of bearing portions 14, with the result that it becomes possible to reduce the generation of abnormal noise such as rattling noise and teeth hammering noise.

In addition, with the sliding bearing 4, which is formed symmetrically in the direction R with respect to a line perpendicular to the flat surface 25 and connecting the axis O and a central point in the direction R of the bearing surface 45 which is a surface of contact with the outer peripheral surface 26 of the rack shaft 1, since the bearing surfaces 45 and 57 are formed on the protruding end faces 44 and 56, respectively, of the protruding portions 46 and 58, the supporting surfaces for the rack shaft 1 can be localized, with the result that it is possible to reduce frictional resistance with respect to the movement of the rack shaft 1 in the axial direction X, thereby making it possible to allow the rack shaft 1 moving in the axial direction X to be supported by a small resisting force. In addition, since each bearing surface 57 is formed on the protruding portion 58 provided on the elastically flexible circular arc portion 54, the circular arc portion 54 can be elastically deflected in correspondence with the radial displacement of the rack shaft 1 by using the bearing base portion 9 as a fulcrum, with the result that this also makes it possible to reduce frictional resistance with respect to the movement of the rack shaft 1 in the axial direction X, thereby making it possible to allow the rack shaft 1 moving in the axial direction X to be supported by a small resisting force.

In addition, with the sliding bearing 4, the bearing surface 45 is adapted to support the rack shaft 1 by being brought into contact with the outer peripheral surface 26 of the rack shaft 1 by the displacement of the rack shaft 1 exceeding a fixed amount in the direction perpendicular to the axial direction X and directed from the rack teeth 7 side of the rack shaft 1 toward the opposite side to the rack teeth 7 side of the rack shaft 1, with the result that it is possible to limit the large displacement of the rack shaft 1 in that direction.

Figure 11:
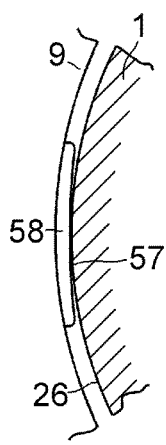
FIG. 11 is an explanatory partial view of other preferred embodiments of the invention.
Figure 11:
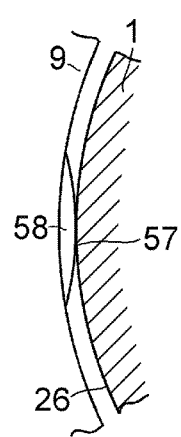
Figure 11:
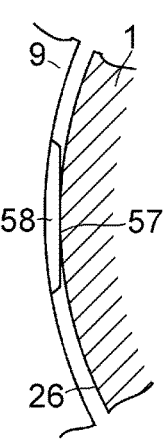

With the above-described sliding bearing 4, although each of the bearing surfaces 45 and 57 is constituted by a circular arc-shaped concave surface having a radius of curvature substantially identical to the radius of curvature of the outer peripheral surface 26 of the rack shaft 1, alternatively, at least one bearing surface of the bearing surfaces 45 and 57, e.g., the bearing surface 57, may be constituted by a circular arc-shaped concave surface having a radius of curvature greater than the radius of curvature of the outer peripheral surface 26 of the rack shaft 1, as shown in the part (A) of FIG. 11, may be constituted by a circular arc-shaped convex surface, as shown in the part (B) of FIG. 11, or may be constituted by a flat surface, as shown in the part (C) of FIG. 11. In such embodiments, as a result of the fact that the contact between the bearing surface 57 and the outer peripheral surface 26 of the rack shaft 1 can be made substantially into line contact, it is possible to reduce frictional resistance with respect to the movement of the rack shaft 1 in the axial direction X, thereby making it possible to allow the rack shaft 1 moving in the axial direction X to be supported by an even smaller resisting force. In the embodiments of the parts (A), (B), and (C) of FIG. 11, the central point in the direction R about the axis of the bearing surface 57 brought into contact with the outer peripheral surface 26 of the rack shaft 1 becomes virtually a point of line contact with the outer peripheral surface 26 of the rack shaft 1.

In addition, although the above-described sliding bearing 4 has the pair of bearing portions 14, the present invention is not limited to the same, and at least another pair of bearing portions which are formed in the same way as the pair of bearing portions 14 may be further provided between the pair of bearing portions 14 and the pair of circular arc portions 17 in the direction R about the axis O.

DESCRIPTION OF REFERENCE NUMERALS

1: rack shaft
2: gear case
3: inner peripheral surface
4: sliding bearing
5: pinion shaft
6: teeth
7: rack teeth
8: notched portion
9: bearing base portion
10: outer peripheral surface
11: end face
12, 14: bearing portion
13, 15: slit
17: circular arc portion
18: outer peripheral surface
19, 20: projection

The invention claimed is:

1. A synthetic resin-made sliding bearing adapted to be interposed between a rack shaft and a gear case by being fixed to an inner peripheral surface of the gear case in order to support the rack shaft inside the gear case movably in an axial direction, comprising:
a semiannular bearing base portion which, at a semicylindrical outer peripheral surface thereof, is adapted to be brought into contact with the inner peripheral surface of the gear case and has a notched portion on a rack teeth side of the rack shaft;
a first bearing portion which has a circular arc-shaped outer peripheral surface adapted to be brought into contact with the inner peripheral surface of the gear case and extends integrally in the axial direction from one axial semiannular end face of said bearing base portion; and
a pair of second bearing portions which extend integrally in the axial direction from the one axial semiannular end face of said bearing base portion in such a manner as to sandwich said first bearing portion through each of a pair of slits in a direction about an axis,
wherein said first bearing portion has a first bearing surface which is adapted to oppose an outer peripheral surface of the rack shaft on an opposite side to the rack teeth side of the rack shaft with a clearance therebetween, and each of said second bearing portions has a second bearing surface which is adapted to be brought into slidable contact with the outer peripheral surface of the rack shaft, and
wherein the first bearing surface is adapted to be brought into contact with the outer peripheral surface of the rack shaft by a displacement of the rack shaft exceeding a fixed amount in a direction perpendicular to the axial direction and directed from the rack teeth side of the rack shaft toward the opposite side to the rack teeth side of the rack shaft.

2. The sliding bearing according to claim 1, wherein said first bearing portion has the circular arc-shaped outer peripheral surface which is adapted to be brought into contact with the inner peripheral surface of the gear case and an inner peripheral surface on which the first bearing surface is provided.

3. The sliding bearing according to claim 1, wherein each of said second bearing portions has an outer peripheral surface which is adapted to oppose the inner peripheral surface of the gear case with a clearance therebetween and an inner peripheral surface on which the second bearing surface which is adapted to be brought into slidable contact with the outer peripheral surface of the rack shaft is formed.

4. The sliding bearing according to claim 1, wherein said first bearing portion includes a circular arc portion which, at an outer peripheral surface thereof, is adapted to be brought into contact with the inner peripheral surface of the gear case and extends integrally in the axial direction from the one axial semiannular end face of said bearing base portion, and a protruding portion which has a first bearing surface formed at a protruding end face thereof and is provided integrally on an inner peripheral surface of the circular arc portion in such a manner as to protrude radially inwardly from the inner peripheral surface of the circular arc portion, so as to oppose the outer peripheral surface of the rack shaft on the opposite side to the rack teeth side of the rack shaft with a clearance therebetween.

5. The sliding bearing according to claim 1, wherein each of said pair of second bearing portions includes an elastically flexible circular arc portion which, at an outer peripheral surface thereof, is adapted to oppose the inner peripheral surface of the gear case with a clearance therebetween and extends integrally in the axial direction from the one axial semiannular end face of said bearing base portion, and a protruding portion which has a second bearing surface formed at a protruding end face thereof and is provided integrally in such a manner as to protrude radially inwardly from an inner peripheral surface of the circular arc portion.

6. The sliding bearing according to claim 1, wherein said pair of second bearing portions are elastically deflectable in radially inward and outward directions by using said bearing base portion as a fulcrum.

7. The sliding bearing according to claim 1, wherein at least one of the first bearing surface and the pair of second bearing surfaces is constituted by a circular arc-shaped concave surface having a radius of curvature substantially identical to a radius of curvature of the outer peripheral surface of the rack shaft.

8. The sliding bearing according to claim 1, wherein at least one of the first bearing surface and the pair of second bearing surfaces is constituted by a circular arc-shaped concave surface having a radius of curvature greater than the radius of curvature of the outer peripheral surface of the rack shaft.

9. The sliding bearing according to claim 1, wherein at least one of the first bearing surface and the pair of second bearing surfaces is constituted by a circular arc-shaped convex surface.

10. The sliding bearing according to claim 1, wherein at least one of the first bearing surface and the pair of second bearing surfaces is constituted by a flat surface.

11. The sliding bearing according to claim 1, wherein said pair of second bearing portions are formed integrally on said bearing base portion in such a manner as to be spaced apart from each other with said first bearing portion located therebetween in the direction about the axis, such that a central angle formed between central points of the second bearing surfaces in the direction about the axis coming into contact with the outer peripheral surface of the rack shaft has an angle not greater than 180°.

12. The sliding bearing according to claim 1, further comprising:
a pair of circular arc portions extending integrally in the axial direction from the one axial semiannular end face of said bearing base portion in such a manner as to sandwich said pair of second bearing portions through each of a pair of other slits in the direction about the axis,
wherein each of said pair of circular arc portions has an outer peripheral surface adapted to be brought into contact with the inner peripheral surface of the gear case and an inner peripheral surface adapted to oppose the outer peripheral surface of the rack shaft with a clearance therebetween.

* * * * *